United States Patent
Baumgartl et al.

(10) Patent No.: US 7,714,031 B2
(45) Date of Patent: May 11, 2010

(54) SHAPED ARTICLES OF MELAMINE/FORMALDEHYDE FOAMS HAVING LOW FORMALDEHYDE EMISSION

(75) Inventors: Horst Baumgartl, Ludwigshafen (DE); Bernd Gross, Grossniedesheim (DE); Jens Schierholz, Bensheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 11/459,915

(22) Filed: Jul. 25, 2006

(65) Prior Publication Data

US 2006/0258763 A1  Nov. 16, 2006

Related U.S. Application Data

(63) Continuation of application No. 10/909,285, filed on Aug. 3, 2004, now abandoned.

(30) Foreign Application Priority Data

Aug. 4, 2003  (DE)  ............... 103 35 957

(51) Int. Cl.
*C08J 9/36* (2006.01)
*B29C 44/56* (2006.01)

(52) U.S. Cl. ............ 521/187; 521/188

(58) Field of Classification Search ........... 521/187, 521/188
See application file for complete search history.

(56) References Cited

U.S. PATENT DOCUMENTS 3,504,064 A  3/1970  Bauer
4,511,678 A  4/1985  Mahnke et al.
4,540,717 A *  9/1985  Mahnke et al. ............. 521/52
2004/0097609 A1  5/2004  Hahnle et al.

FOREIGN PATENT DOCUMENTS

| DE | 35 34 739 | 4/1987 |
| EP | 017 671 | 10/1980 |
| EP | 032 470 | 10/1981 |
| EP | 0111860 | 6/1984 |
| EP | 451 535 | 10/1991 |
| EP | 464490 | 1/1992 |
| FR | 1108336 | 1/1956 |
| WO | 01/94436 | 12/2001 |

OTHER PUBLICATIONS

Houben-Weyl, Methoden der organischen Chemie, vol. 14/2 (1963) pp. 319-402.

* cited by examiner

*Primary Examiner*—Irina S Zemel
(74) *Attorney, Agent, or Firm*—Novak Druce + Quigg LLP

(57) ABSTRACT

Shaped articles of melamine/formaldehyde foam have a formaldehyde emission of less than 0.1 ppm, determined according to DIN 55666, and are obtainable by the following process:

a) a foam is prepared from a melamine/formaldehyde precondensate having a molar melamine: formaldehyde ratio greater than 0.5,
b) the foam obtained is annealed at below 200° C., and
c) the annealed foam is molded in a press at from 160 to 240° C. and an absolute pressure from 5 to 100 bar in the course of from 15 to 120 seconds to give the shaped article.

20 Claims, No Drawings

SHAPED ARTICLES OF MELAMINE/FORMALDEHYDE FOAMS HAVING LOW FORMALDEHYDE EMISSION

REFERENCE TO RELATED APPLICATION

This application is a continuation of U.S. patent application Ser. No. 10/909,285 filed 3 Aug. 2004.

The present invention relates to shaped articles of melamine/formaldehyde foam, which shaped articles have a formaldehyde emission of less than 0.1 ppm, determined according to DIN 55666, and are obtainable by the following process:

a) a foam is prepared from a melamine/formaldehyde precondensate having a molar melamine: formaldehyde ratio greater than 0.5, b) the foam obtained is annealed at below 200° C., and c) the annealed foam is molded in a press at from 160 to 240° C. and an absolute pressure of from 5 to 100 bar in the course of from 15 to 120 minutes to give the shaped article.

The present invention furthermore relates to said process for the production of the shaped articles, and the use of the shaped articles for acoustic and thermal insulation.

Owing to their material properties, such as high heat resistance, advantageous fire behavior and good resistance to chemicals, three-dimensional moldings of open-cell, resilient thermosetting plastic foams are particularly suitable for demanding applications in heat and sound insulation.

Open-cell resilient foams based on melamine/formaldehyde condensates and processes for their preparation are known and are described, for example, in the Patent Applications EP-A 17 671, 17 672 and 37 470 and the corresponding patents. A blowing agent-containing solution or dispersion of a melamine/formaldehyde precondensate is foamed by heating, for example by means of hot air, steam, exposure to high-frequency radiation or exposure to microwave radiation or by utilizing the heat of reaction, to a temperature above the boiling point of the blowing agent. Depending on the foaming process and molding, a foam block or strand is obtained, which is cured by annealing (heat treatment in which the foam is kept at a defined, generally elevated temperature for a defined time) to give the finished foam.

While simple shaped articles, for example sheets or strips, can be produced from the foam by cutting or sawing, more demanding shaping methods are required for shaped articles having a more complicated three-dimensional shape. Such parts having a complicated shape are, for example, contained in motor vehicles (e.g. engine space insulation) or machines or serve as pipe insulation. For the production of such parts, FR-A 1 108 336 discloses molding a foam which is in the curing state but still moldable and subsequently completing the curing of the foam thus compressed. U.S. Pat. No. 3,504,064 and EP-A 464 490 describe processes in which the foam is treated with water or steam and is molded before or afterward. EP-A 111 860 describes the molding of melamine resin foams at from 60 to 300° C. and at least 1.2 bar absolute pressure.

The shaped articles of melamine/formaldehyde resin which are obtained by the abovementioned processes contain residual amounts of unconverted formaldehyde which are continuously released into the ambient air over a long time. These formaldehyde emissions increase with increasing temperature and humidity. They are undesirable and, particularly when the shaped articles are used in closed rooms, are disadvantageous. For example, in interior rooms of buildings or in a vehicle interior, the formaldehyde concentration of the air should be as low as possible.

WO 01/94436 describes a process for the preparation of melamine/formaldehyde foams having a reduced formaldehyde emission, for which purpose a melamine/formaldehyde precondensate having a molar melamine: formaldehyde ratio greater than 1:2 is used. The blowing agent-containing mixture to be foamed is expanded by heating to give, for example, right parallelepiped strands or blocks. Thereafter, the expanded foam blocks are annealed for from 1 to 180 minutes at from 120 to 300° C., in the examples for 30 minutes at 220° C., and are cured. The foams obtained in this manner have a low formaldehyde content but are not thermoformable.

EP-A 451 535 describes a process for the production of a shaped article from melamine resin foam, in which the shaped article blank is impregnated with a heat-curable binder and then molded at elevated temperatures. Binders used are phenol resins or melamine resins, which are applied to the surface of the blank by spreading or are applied as foam.

DE-A 196 49 796 discloses a similar process, a (meth) acrylamide polymer dispersion being used as the binder. The two last-mentioned processes accordingly require an additional starting material which has to be applied in an additional operation.

The shaped articles obtained by the processes of the prior art without impregnation by pressing, in particular sheet-like shaped articles, do not have the desired geometry in all cases, i.e. the three-dimensional shape of the finished shaped article deviates from the geometry of the compression mold and the shaped article does not have the desired shape. Moreover, the borders or edges of the shaped part frequently do not have the desired stability, for example they are not closed, or do not have a sufficient mechanical load capacity. In these cases, the shaped article cannot be used for applications which require a good accuracy of fit, for example in vehicle construction, or the geometry of the shaped article or the edges have to be reworked in an additional complicated operation.

It is an object of the present invention to remedy the disadvantages described. In particular, it is an object of the present invention to provide shaped articles of melamine/formaldehyde foam which have a low formaldehyde emission.

It was also intended to provide a process by means of which the shaped articles can be produced in a simple manner. For example, the aid of water or steam for shaping was to be superfluous.

Furthermore, the shaped articles should be capable of being produced without the presence of binders. In particular, the process should manage without the additional impregnation step in which the binder is applied.

Moreover, the shaped articles should have exactly the desired geometry and stable, precisely shaped borders or edges.

Finally, it was intended to provide shaped articles which meet all abovementioned requirements simultaneously, i.e. the shaped articles should have a low formaldehyde content and should be capable of being produced in a simple manner, in the desired geometry and with stable and precise borders or edges, in few process steps, without shaping by means of steam, and without impregnation with binders.

We have found that these objects are achieved by the shaped articles, processes and uses defined at the outset. Preferred embodiments of the invention are described in the subclaims.

According to the invention, the shaped articles of melamine/formaldehyde foam have a formaldehyde emission of less than 0.1 ppm, determined according to DIN 55666 of April 1995. 0.1 ppm corresponds to 0.12 mg of formaldehyde per $m^3$ of air.

The formaldehyde emission is preferably less than 0.05 ppm, determined as described above.

The novel shaped articles accordingly have a particularly low formaldehyde content. They are obtainable by a novel process containing three steps a), b) and c).

In step a) of the process, a foam is prepared from a melamine/formaldehyde precondensate having a molar melamine: formaldehyde ratio greater than 0.5. This is effected in a manner known per se and is described, for example, in WO 01/94436.

Here, a melamine/formaldehyde precondensate is used as a starting material. Melamine/formaldehyde condensates may contain, in addition to melamine, up to 50, preferably up to 20, % by weight of modifying compounds and, in addition to formaldehyde, up to 50, preferably up to 20, % by weight of other aldehydes, in the form of condensed units. An unmodified melamine/formaldehyde condensate is particularly preferred. Examples of suitable modifying compounds are alkyl- and aryl-substituted melamine, urea, urethanes, carboxamides, dicyandiamide, guanidine, sulfurylamide, sulfonamides, aliphatic amines, glycols, phenol and derivatives thereof. Other aldehydes which may be used are, for example, acetaldehyde, trimethylolacetaldehyde, acrolein, benzaldehyde, furfurol, glyoxal, glutaraldehyde, phthalaldehyde and terephthalaldehyde. Further details on melamine/formaldehyde condensates are to be found in Houben-Weyl, Methoden der organischen Chemie, Volume 14/2, 1963, pages 319 to 402.

The molar melamine: formaldehyde ratio is defined as the quotient of the amount of melamine and amount of formaldehyde and, according to the invention, is greater than 0.5 (i.e. 1:2). It is preferably from 1 (i.e. 1:1) to 0.526 (i.e. 1:1.9), in particular from 0.769 (i.e. 1:1.3) to 0.556 (i.e. 1:1.8).

According to EP-A 37470, the melamine resins advantageously contain sulfite groups in the form of condensed units, which can be effected, for example, by adding from 1 to 20% by weight of sodium bisulfite during the condensation of the resin. It has now been found that a relatively high content of sulfite groups in the case of a constant melamine : formaldehyde ratio results in a higher formaldehyde emission of the foam. The precondensate used should therefore preferably contain virtually no sulfite groups, i.e. the content of sulfite groups should preferably be less than 1%, particularly preferably less than 0.1%, in particular zero, based on the precondensate.

The addition of an emulsifier or of emulsifier mixture is required for emulsifying the blowing agent and for stabilizing the foam. Anionic, cationic and nonionic surfactants and mixtures thereof may be used as the emulsifier. Suitable anionic surfactants are diphenylene oxide sulfonates, alkane- and alkylbenzenesulfonates, alkylnaphthalenesulfonates, olefinsulfonates, alkylether sulfonates, fatty alcohol sulfates, ether sulfates, alpha-sulfo-fatty esters, acylaminoalkanesulfonates, acylisethionates, alkyl ether carboxylates, N-acylsarcosinates, alkyl and alkyl ether phosphates. Alkylphenol polyglycol ethers, fatty alcohol polyglycol ethers, fatty acid polyglycol ethers, fatty acid alkanolamines, EO/PO block copolymers, amine oxides, glyceryl fatty esters, sorbitan esters and alkylpolyglucosides may be used as nonionic surfactants. Cationic emulsifiers which may be used are alkyltriammonium salts, alkylbenzyldimethylammonium salts and alkylpyridinium salts. The emulsifiers are preferably added in amounts of from 0.2 to 5% by weight, based on the resin.

In order to produce a foam from the melamine resin solution, said solution must contain an emulsified blowing agent, the amount depending on the desired density of the foam. In principle, both physical and chemical blowing agents may be used in the novel process. Possible physical blowing agents are, for example, hydrocarbons, halogenated, in particular fluorinated, hydrocarbons, alcohols, ethers, ketones and esters in liquid form or air and $CO_2$ as gases. Examples of suitable chemical blowing agents are isocyanates as a mixture with water, $CO_2$ being liberated as the effecting blowing agent, and furthermore carbonates and bicarbonates as a mixture with acids, which likewise produce $CO_2$, and azo compounds, such as azodicarboxamide. In a preferred embodiment of the invention, from 1 to 40% by weight, based on the resin, of a physical blowing agent having a boiling point of from 0 to 80° C. are added to the aqueous solution or dispersion; in the case of pentane, it is preferably from 5 to 15% by weight.

Curing agents used are acidic compounds which catalyze the further condensation of the melamine resin. The amounts are from 0.01 to 20, preferably from 0.05 to 5, % by weight, based on the resin. Inorganic and organic acids are suitable, for example hydrochloric acid, sulfuric acid, phosphoric acid, nitric acid, formic acid, acetic acid, oxalic acid, toluenesulfonic acids, amidosulfonic acids and acid anhydrides.

Depending on the use of the shaped article, the aqueous solution or dispersion may be free of further additives. For some purposes, however, it may be advantageous to add up to 20, preferably less than 10, % by weight, based on the resin, of conventional additives, such as dyes, flameproofing agents, UV stabilizers, and compositions for reducing the combustion gas toxicity or for promoting carbonization. Since the foams are generally open-pore and can absorb water, it may be necessary for some intended uses to add water repellants in amounts of from 0.2 to 5% by weight. For example, paraffin dispersions, silicone dispersions and fluoroalkane dispersions, in particular emulsions thereof, are suitable.

The concentration of the melamine/formaldehyde precondensate in the mixture of precondensate and solvent may vary within wide limits of from 55 to 85, preferably from 63 to 80, % by weight. The preferred viscosity of the mixture of precondensate and solvent is from 1 to 3 000, preferably from 5 to 2 000, mPa·s.

The additives are homogeneously mixed with the aqueous solution or dispersion of the melamine resin, it being possible, if necessary, also to force in the blowing agent under pressure. However, it is also possible to start from a solid, for example spray-dried, melamine resin and then to mix this with an aqueous solution of the emulsifier, the curing agent and the blowing agent. The mixing with the components can be carried out, for example, in an extruder. After the mixing, the solution or dispersion is discharged through a die and immediately thereafter heated and foamed thereby.

The heating of the blowing agent-containing solution or dispersion can in principle be carried out—as described, inter alia, in EP-A 17671—by means of hot air, steam, exposure to high-frequency radiation or exposure to microwave radiation or by utilizing the heat of reaction. Preferably, however, the required heating is carried out by exposure to ultrahigh frequency radiation, according to EP-A 37470. In the case of this dielectric radiation, it is possible in principle to employ microwaves in the frequency range from 0.2 to 100 GHz. For industrial practice, frequencies of 0.915, 2.45 and 5.8 GHz are available, 2.45 GHz being particularly preferred. A radiation source of dielectric radiation is the magnetron, it also being possible to effect exposure simultaneously with a plurality of magnetrons. During the exposure to radiation, it should be ensured that the field distribution is very homogeneous. Expediently, the exposure to radiation is carried out in such a way that the power consumption of the solution or dispersion is from 5 to 200, preferably from 9 to 120, kW, based on 1 kg of water in the solution or dispersion. If the power consumed is lower, no foaming takes place and the mixture merely cures. If the procedure is effected within the preferred range, the mixture foams all the more rapidly the greater the power consumption. Above about 200 kW per kg of water, the foaming rate no longer increases substantially.

The exposure of the mixture to be foamed to radiation is usually effected immediately after it has emerged from the foam die. The mixture which is foaming as a result of a temperature increase and evaporation of the blowing agent is applied, for example, onto revolving belts which form a rectangular channel for shaping the foam. A foam strand, which is usually divided into slabs, is obtained.

Suitable melamine/formaldehyde foams are commercially available, for example, as Basotect® from BASF.

In step b) of the novel process, the foam obtained in step a) is annealed at below 200° C. Preferably, annealing is effected at temperatures (annealing temperatures) above 100° C. The annealing temperature is preferably from 110 to 200° C., in particular from 110 to 160° C.

During the annealing, postcuring takes place, i.e. the foam cures further. Moreover, the annealing reduces the formaldehyde emission of the foam. Residues of other volatile ingredients are also substantially removed during the annealing, for example monomer residues, blowing agent and other assistants.

The duration of the annealing (annealing time) depends, inter alia, on the dimensions of the foam, its composition and the temperature at which annealing is effected. Annealing time and annealing temperature are chosen in the manner known to a person skilled in the art, so that the postcuring described can take place. The annealing time is preferably from 5 to 60, in particular from 10 to 30, minutes. The pressure (annealing pressure) prevailing during the annealing may be, for example, atmospheric pressure (1 013 mbar).

The annealing temperature and pressure may be constant over the entire annealing time or may be varied in a suitable manner. Preferably, constant conditions are employed, but temperature or pressure programs may also be advantageous.

The annealing can be effected by conventional methods in conventional apparatuses, for example in heating ovens or heating chambers. However, annealing is preferably effected by means of hot air or other hot gases, which are passed through the foam.

In a particularly preferred embodiment, annealing is effected directly after the preparation of the foam, by treating the foam obtained in the foam preparation, for example the foam slabs mentioned, with hot air. The hot air flowing through cures the foam slab.

In an embodiment which is likewise preferred, individual sheets or layers of, for example, from 0.1 to 10, in particular from 0.5 to 5, cm thickness are produced from the annealed foam slab obtained in this manner by cutting. If required, a blank can be produced from the sheet or layer obtained, for example by trimming the edges of the sheet or layer appropriately, or the blank can be punched out of the sheet or layer. The foam sheet or layer obtained or the blank can then be molded in step c) of the process.

Of course, suitable foam sheets, layers or blanks can also be produced in another manner, for example by sawing instead of cutting, or by other conventional finishing methods. It is also possible, but not preferred, to design the foaming and annealing in such a way that a sheet or layer of the desired thickness forms immediately, i.e. without cutting or other finishing.

The foam sheet or layer or the blank preferably has the same thickness everywhere (plane-parallel surfaces). Depending on the desired geometry and density distribution of the finished shaped article, however, it is also possible, for example by appropriate cutting of the foam slab or contour or profile cutting, also to produce sheets, layers or blanks which are wedge-shaped or roof-shaped or non-plane-parallel in another manner.

It is also possible first to produce foam sheets, layers or blanks from the unannealed foam and then to anneal them.

In step c) of the novel process, the annealed foam obtained in step b) is molded in a press at from 160 to 240° C. and an absolute pressure of from 5 to 100 bar in the course of from 15 to 120 seconds to give the shaped article.

Preferably, molding is carried out at a temperature (press temperature) of from 180 to 220° C. and an absolute pressure (press pressure) of from 10 to 80 bar. The preferred press time is from 20 to 60 seconds.

Press temperatures, pressures and times to be chosen in the individual case depend in the usual manner on the composition of the foam (for example the type and amount of the curing agent) and on the density, thickness and hardness of the foam to be molded, for example also after the pretreatment of the foam, which also includes the annealing in step b). Moreover, inter alia, the density, thickness, form and hardness of the desired shaped article, and any laminations or top layers (see below) present, have to be taken into account. Press temperature, pressure and time are preferably set in such a way that the shaped article obtained in step c) substantially already has the final three-dimensional shape.

Shaped articles having a large area or large volume may require a longer press time than smaller shaped articles. Moreover, the press pressure can, if required, be all the higher and/or the press time all the longer the harder or thicker the annealed foam and the higher the desired density of the finished shaped article is to be.

Press temperature and press pressure may be constant over the entire press time or may be varied in a suitable manner. In general, molding is effected under constant conditions, but temperature or pressure programs may also be advantageous, particularly in the case of parts which are large or have complicated shapes.

The molding is effected in a conventional manner and preferably batchwise, by placing the annealed foam obtained in step b), preferably in the form of a foam sheet, layer or blank, in a suitable press and molding it. The compression mold is as a rule heatable, for example by electric heating or heating by means of a heating medium, and the press is usually provided with an ejection apparatus. Contour molds, by means of which those shaped articles which are to have precisely shaped edges or borders, for example profiled edges or lips, can be particularly readily produced are suitable as a compression mold.

Suitable presses are, for example, daylight presses (single- or multi-daylight presses), toggle presses, down-stroke presses, molding presses (transfer molding presses), up-stroke presses and automatic presses. After the molding, the press is usually opened and the finished shaped article is removed from the press by means of an ejection apparatus.

The shaped articles obtainable by the novel process described above already have very low formaldehyde emissions of not more than 0.1 ppm, determined as stated above.

In a preferred embodiment, after the molding (step c)), the finished shaped articles are stored in step d) at a temperature (storage temperature) of above 180° C. for at least 30 minutes (storage time).

Preferably, the storage temperature is not more than 240° C., and particularly preferably from 200 to 220° C. Preferably, the shaped articles are stored at from 30 to 120 minutes. The storage can be effected, for example, at atmospheric pressure, e.g. 1 013 mbar.

As a result of the subsequent storage, the formaldehyde emission can be even further reduced. The content of other, abovementioned volatile ingredients can also be further reduced. Moreover, it was observed that the shaped articles become more hydrophobic as a result of the storage described. Possibly, polar (i.e. hydrophilic) functional groups which are still contained in the melamine/formaldehyde polymer are eliminated at the storage temperature of above 180° C., with the result that the polymer becomes more nonpolar, i.e. more hydrophobic. If a water drop is applied to such a hydrophobic foam, it retains its hemispherical shape on the foam surface and is not immediately absorbed, as in the case of hydrophilic foam.

The shaped articles can be used as such, i.e. with untreated, in particular unlaminated, surfaces. In a preferred embodiment, one or more surfaces of the shaped article have been provided with or laminated with top layers, for example with glass fiber or textile layers (in particular nonwovens or woven fabrics), metal sheets, woven metal fabrics or metal foils, plastics layers, woven plastics fabrics, plastics nonwovens or plastics films, which may also be foamed. Textile layers which may be used are nonwovens or woven fabrics based on glass fibers, polyester fibers, carbon fibers, aramid fibers or flame-retardant natural fibers.

The top layer or lamination can be applied to the surface of the shaped article in a conventional manner, for example by adhesive bonding using adhesives suitable for this purpose, and, particularly in the case of nonwovens and woven fabrics, also by sewing, quilting, stapling, needle-felting or riveting.

The top layer or lamination can subsequently be applied to the finished shaped article or, preferably, can be applied during the production of the shaped article. For example, during molding of the foam in step c), the foam can be covered with corresponding top layers or laminations and then molded, or the top layers or laminations can be placed in the compression mold and molded with the foam. If it is intended, for example, to laminate a sheet-like shaped article with a nonwoven A on its underside and with a nonwoven B on its top, the layers can be arranged in the sequence A-S-B and then molded (S=foam layer), with the result that the shaped article laminated on both sides forms in one operation.

Multilayer laminations are of course also possible, for example by successive application of further layers to the finished shaped article, or during the production of the shaped article by molding layers lying one on top of the other, which were arranged beforehand in the desired sequence. Of course, a first lamination can be applied during molding and an additional lamination subsequently.

Particularly preferably, one or more surfaces of the shaped article are laminated with a hydrophobic or oleophobic textile layer. For example, glass fibers, polyester fibers or polyamide fibers which have been rendered hydrophobic with paraffin emulsions, silicone emulsions or fluoroalkane emulsions are suitable as the hydrophobic textile layer. For example, glass fibers, polyester fibers or polyamide fibers which have been rendered oleophobic with fluoroalkane emulsions are suitable as the oleophobic textile layer.

According to the above description, the invention relates not only to the shaped articles but also to the process for the production of shaped articles, comprising the following steps:
a) a foam is prepared from a melamine/formaldehyde precondensate having a molar melamine: formaldehyde ratio greater than 0.5,
b) the foam obtained is annealed at below 200° C., and
c) the annealed foam is molded in a press at from 160 to 240° C. and an absolute pressure of from 5 to 100 bar in the course of from 15 to 120 seconds to give the shaped article;

and it relates to said process, comprising, after the molding (step c))
d) storing the shaped articles at above 180° C. for at least 30 minutes.

The novel shaped articles have a wide range of uses. The use of the shaped articles for acoustic or thermal insulation is preferred and is likewise a subject of the invention.

They are used, for example, in the building trade as heat insulation and for sound insulation of buildings and parts of buildings, in particular of ceilings and walls, and furthermore for heat insulation and sound insulation of the interiors of vehicles and aircraft, for sound insulation of vehicle engine spaces and for low-temperature insulation, for example of cold rooms and liquefied gas containers. Owing to the great hardness of crosslinked melamine resins, the shaped articles can also be cleaning, grinding and polishing sponges having a slightly abrasive effect, it being possible to apply suitable cleaning, grinding and polishing materials to the surface of the sponge or to introduce said materials into the interior of the sponge. Furthermore, the sponges can also be rendered hydrophobic and oleophobic for special cleaning tasks.

The use in vehicle construction, in mechanical engineering, in the building trade and for insulating pipelines is particularly preferred. In vehicle construction, the shaped articles are used, for example, as engine hood insulation, dashboard insulation or gear tunnel covering. In mechanical engineering, they may be employed, for example in combination with layers of heavy materials, for sound insulation of loud engines. These uses are also a subject of the invention.

The novel shaped articles have very low formaldehyde emissions. They can be produced in a simple manner. The finished shaped article exhibits a good impression of the geometry of the compression mold, i.e. it has the desired geometry, and possesses precise, closed, stable and mechanically strong borders or edges.

The novel process for the production of the shaped articles comprises a few simple operations. Thus, no water or steam is required for shaping. Likewise, no binder need be present, in particular there is no need for impregnation with a binder in an additional operation.

EXAMPLES

Novel Example 1

A foam was prepared in a conventional manner from a melamine/formaldehyde precondensate having a molar melamine: formaldehyde ratio of 0.625 (i.e. 1:1.6) and was annealed at 160° C. with hot air. The annealed foam was cut into 25 mm thick sheets.

The blank was covered on its top and underside in each case with a hydrophobic textile nonwoven. Thereafter, molding was carried out in a contour mold for 30 seconds at a press temperature of 200° C. and a press pressure of 60 bar (absolute).

The shaped article removed from the compression mold exhibited a very good impression of the geometry of the compression mold, with stable, closed and mechanically strong lips. The formaldehyde emission was 0.02 ppm, measured according to DIN 55666.

Comparative Example 1:

Example 1 was repeated, the molar melamine: formaldehyde ratio of the precondensate being 0.333 (i.e. 1:3) and the foam being annealed at 240° C.

The shaped article removed from the compression mold exhibited an incomplete impression of the geometry of the compression mold, with lips which were not closed, and was therefore unusable. The formaldehyde emission was 0.03 ppm, measured according to DIN 55666.

The comparative example shows that shaped articles having a low formaldehyde content can also be produced from formaldehyde-rich melamine resins. However, a high temperature of 240° C., not according to the invention, was required for this purpose. The shaped article obtained was waste since it was incorrectly shaped and had inadequate borders.

Comparative Example 2:

Example 1 was repeated, the molar melamine : formaldehyde ratio of the precondensate being 0.333 (i.e. 1:3) and the foam was annealed at 160° C. as in example 1.

The shaped article removed from the compression mold exhibited a very good impression of the geometry of the compression mold, with stable, closed and mechanically strong lips. The formaldehyde emission was 7 ppm, measured according to DIN 55666.

When the annealing temperature was reduced, according to the invention, below 200° C., in this case to 160° C., a correctly shaped article having good borders was obtained, but the shaped article did not have a low formaldehyde content: the formaldehyde emission of 7 ppm was much higher than the maximum value of 0.1 ppm according to the invention.

We claim:

1. A process for the production of a shaped article of melamine/formaldehyde foam, comprising the following steps:
    a) preparing a foam from a melamine/formaldehyde precondensate having a molar melamine:formaldehyde ratio greater than 0.5,
    b) annealing the foam at a temperature of from 110 to 160° C. for from 5 to 60 minutes, and
    c) molding the annealed foam in a press at from 160 to 240° C.,
        an absolute pressure of from 5 to 100 bar, and
        in the course of from 15 to 120 seconds to produce the shaped article.
2. The process of claim 1, wherein, after the molding (step c)
    d) the shaped article is stored at above 180° C. for at least 30 minutes.
3. The process of claim 1, wherein in step b) the foam is annealed for from 10 to 30 minutes.
4. The process of claim 1, wherein the molding in step c) is at a temperature of from 180 to 220° C.
    an absolute pressure of from 10 to 80 bar, and
    in the course of from 20 to 60 seconds.
5. The process of claim 2, wherein the shaped article is stored in step d) at a temperature of from 200 to 220° C. for 30 to 120 minutes, and at atmospheric pressure.
6. The process of claim 1, wherein after step c), the shaped article has a formaldehyde emission of less than 0.1 ppm.
7. The process of claim 6, wherein the emission is determined according to DIN 55666.
8. The process of claim 1, wherein the process does not comprise a binder impregnation step.
9. The process of claim 1, wherein the shaped article has stable and precise borders and edges.
10. The process of claim 1, wherein the shaped article has a formaldehyde emission of less than 0.05 ppm.
11. The process of claim 1, wherein the precondensate has a molar melamine:formaldehyde ratio of from 1 to 0.526.
12. The process of claim 1, wherein the precondensate has a molar melamine:formaldehyde ratio of from 0.769 to 0.556.
13. The process of claim 1, wherein the annealing is conducted at atmospheric pressure.
14. The process of claim 1, wherein the annealing temperature is constant over the entire annealing time.
15. The process of claim 1, wherein the annealing temperature varies over the annealing time.
16. The process of claim 1, wherein the annealing pressure is constant over the entire annealing time.
17. The process of claim 1, wherein the annealing pressure varies over the annealing time.
18. The process of claim 1, wherein the annealing is effected by passing a gas through the foam.
19. The process of claim 1, wherein the annealing is effected directly after the preparation of the foam.
20. The process of claim 19, wherein the annealing is effected by passing a gas through the foam, and wherein the gas cures the foam.

* * * * *